United States Patent
Onggosanusi et al.

(10) Patent No.: US 11,082,097 B2
(45) Date of Patent: Aug. 3, 2021

(54) METHOD AND APPARATUS FOR ENABLING UPLINK MIMO

(71) Applicant: Samsung Electronics Co., Ltd., Suwon-si (KR)

(72) Inventors: Eko Onggosanusi, Coppell, TX (US); Md. Saifur Rahman, Plano, TX (US); Aris Papasakellariou, Houston, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/572,465

(22) Filed: Sep. 16, 2019

(65) Prior Publication Data

US 2020/0014434 A1    Jan. 9, 2020

Related U.S. Application Data

(63) Continuation of application No. 15/491,927, filed on Apr. 19, 2017, now Pat. No. 10,419,086.

(60) Provisional application No. 62/483,639, filed on Apr. 10, 2017, provisional application No. 62/470,622, filed on Mar. 13, 2017, provisional application No. 62/413,725, filed on Oct. 27, 2016, provisional application No. 62/327,725, filed on Apr. 26, 2016.

(51) Int. Cl.
*H04W 4/00* (2018.01)
*H04B 7/0456* (2017.01)
*H04B 7/0413* (2017.01)

(52) U.S. Cl.
CPC ......... *H04B 7/0456* (2013.01); *H04B 7/0413* (2013.01)

(58) Field of Classification Search
None
See application file for complete search history.

(56) References Cited

U.S. PATENT DOCUMENTS

| 2011/0200071 | A1  | 8/2011  | Hamaguchi et al. |
| 2011/0258699 | A1* | 10/2011 | Zugenmaier ......... H04L 1/0065 726/22 |
| 2012/0127948 | A1  | 5/2012  | Chung et al. |

(Continued)

OTHER PUBLICATIONS

"3rd Generation Partnership Project; Technical Specification Group Radio Access Network; Study on Elevation Beamforming/Full-Dimension (FD) MIMO for LTE (Release 13)", 3GPP TR 36.897 V1.0.0 (May 2015), 59 pages.

(Continued)

*Primary Examiner* — Clemence S Han

(57) ABSTRACT

Methods and apparatuses enabling uplink multiple-input multiple-output (MIMO) are provided. A user equipment (UE) includes a transceiver and a processor operably connected to the transceiver. The transceiver is configured to receive an uplink (UL) grant for an UL transmission. The processor is configured to decode a precoding information field in downlink control information (DCI) associated with the UL grant. The precoding information field includes at least one precoding matrix indicator (PMI) corresponding to a plurality of precoders. The transceiver is further configured to precode a data stream according to the precoders indicated by the precoding information field and transmit the precoded data stream on an UL channel.

17 Claims, 11 Drawing Sheets

(56) References Cited

U.S. PATENT DOCUMENTS

| | | | | |
|---|---|---|---|---|
| 2012/0287875 A1* | 11/2012 | Kim | ................... | H04W 76/27 |
| | | | | 370/329 |
| 2015/0049625 A1* | 2/2015 | Kim | ................... | H04B 7/0619 |
| | | | | 370/252 |
| 2015/0085763 A1* | 3/2015 | Gao | ................... | H04B 7/0417 |
| | | | | 370/329 |
| 2015/0131551 A1 | 5/2015 | Kakishima et al. | | |
| 2015/0173079 A1 | 6/2015 | Yokomakura et al. | | |
| 2018/0192434 A1 | 7/2018 | Lee et al. | | |

OTHER PUBLICATIONS

Samsung, "UL MIMO for NR", 3GPP TSG RAN WG1 Meeting #86, Aug. 22-26, 2016, R1-166782, 5 pages.

Samsung, "UL Non-Codebook-Based Transmission", 3GPP TSG RAN WG1 88, Feb. 13-17, 2017, R1-1702921, 3 pages.

Communication pursuant to Article 94(3) EPC dated Feb. 26, 2020 in connection with European Patent Application No. 17 789 920.0, 7 pages.

Non-final Office Action dated Oct. 6, 2020 in connection with U.S. Appl. No. 16/656,515, 7 pages.

Indian Patent Office, Examination Report regarding Application No. 201837044297, dated Mar. 30, 2021, 6 pages.

* cited by examiner

METHOD AND APPARATUS FOR ENABLING UPLINK MIMO

CROSS-REFERENCE TO RELATED APPLICATIONS AND CLAIM OF PRIORITY

This application is a continuation of U.S. patent application Ser. No. 15/491,927, filed Apr. 19, 2017, which claims benefit of priority under 35 U.S.C. § 119(e) to: U.S. Provisional Patent Application No. 62/327,725 filed Apr. 26, 2016; U.S. Provisional Patent Application No. 62/413,725 filed Oct. 27, 2016; U.S. Provisional Patent Application No. 62/470,622 filed Mar. 13, 2017; and U.S. Provisional Patent Application No. 62/483,639, filed Apr. 10, 2017. The contents of the above-identified patent applications are hereby incorporated by reference in their entirety.

TECHNICAL FIELD

The present disclosure relates generally to methods for enabling uplink multiple-input multiple-output (MIMO). Such methods can be used when a user equipment is equipped with a plurality of transmit antennas and transmit-receive units.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry that accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive an uplink (UL) grant for an UL transmission. The processor is configured to decode a precoding information field in downlink control information (DCI) associated with the UL grant. The precoding information field includes at least one precoding matrix indicator (PMI) corresponding to a plurality of precoders. The transceiver is further configured to precode a data stream according to the precoders indicated by the precoding information field and transmit the precoded data stream on an UL channel.

In another embodiment, a base station (BS) is provided. The BS includes a processor and a transceiver operably connected to the processor. The processor is configured to generate a precoding information field in DCI and generate an UL grant for an UL transmission to a UE. The transceiver is configured to transmit, to the UE, the UL grant via a downlink (DL) channel. The DCI is associated with the UL grant and the precoding information field includes at least one PMI corresponding to a plurality of precoders.

In another embodiment, a method for operating a UE is provided. The method includes receiving, by the UE, an UL grant for an UL transmission. The method also includes decoding, by the UE, a precoding information field in DCI associated with the UL grant, where the precoding information field includes at least one PMI corresponding to a plurality of precoders. The method also includes precoding, by the UE, a data stream according to the precoders indicated by the precoding information field. The method also includes transmitting, by the UE, the precoded data stream on an UL channel.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
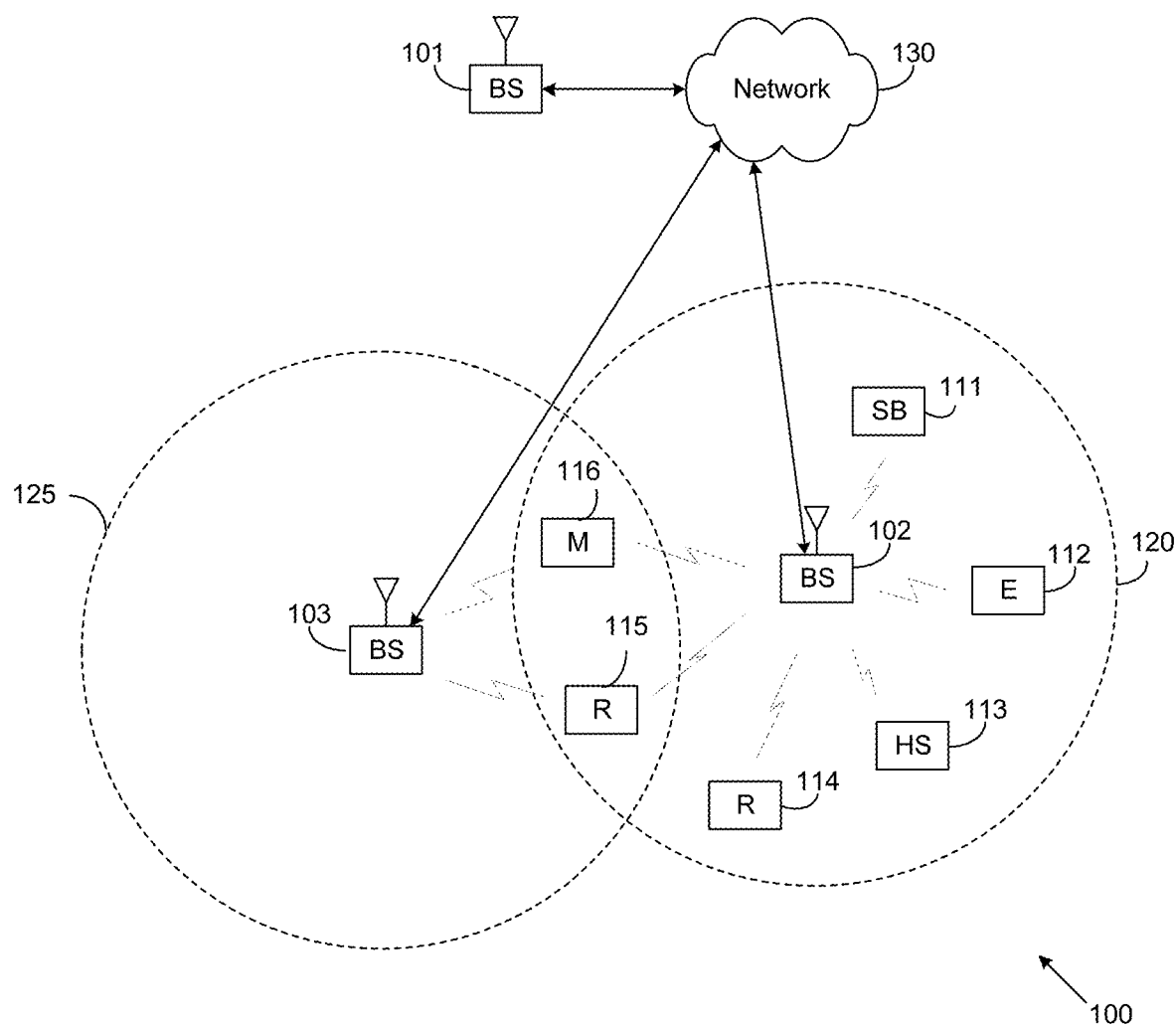
FIG. 1 illustrates an example wireless network according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an alternative term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive transmission scheme or precoding information signaled in an uplink grant and transmit accordingly.

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
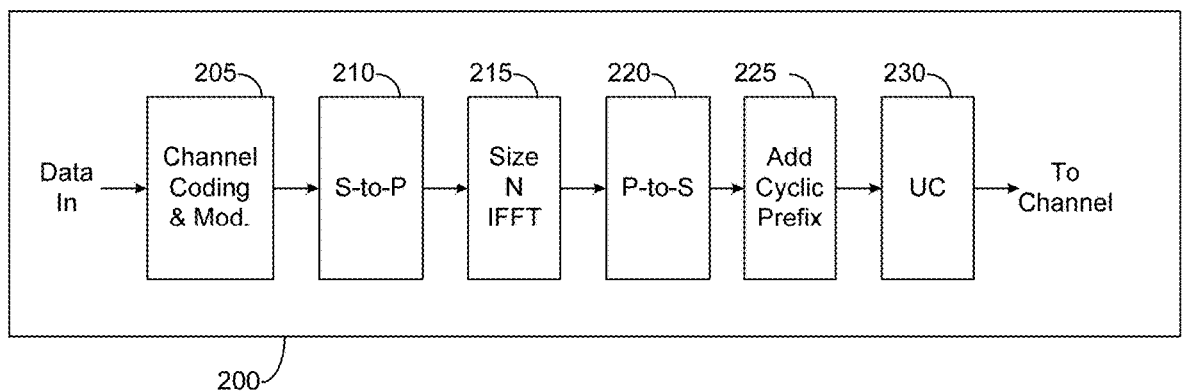
FIGS. 2A and 2B illustrate example wireless transmit and receive paths according to various embodiments of the present disclosure.
Figure 2B:
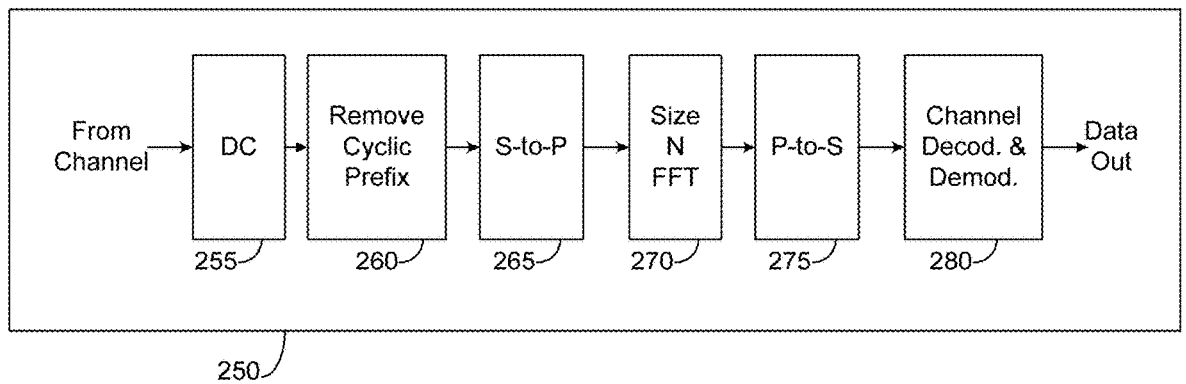

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive transmission scheme or precoding information signaled in an uplink grant and transmit accordingly as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
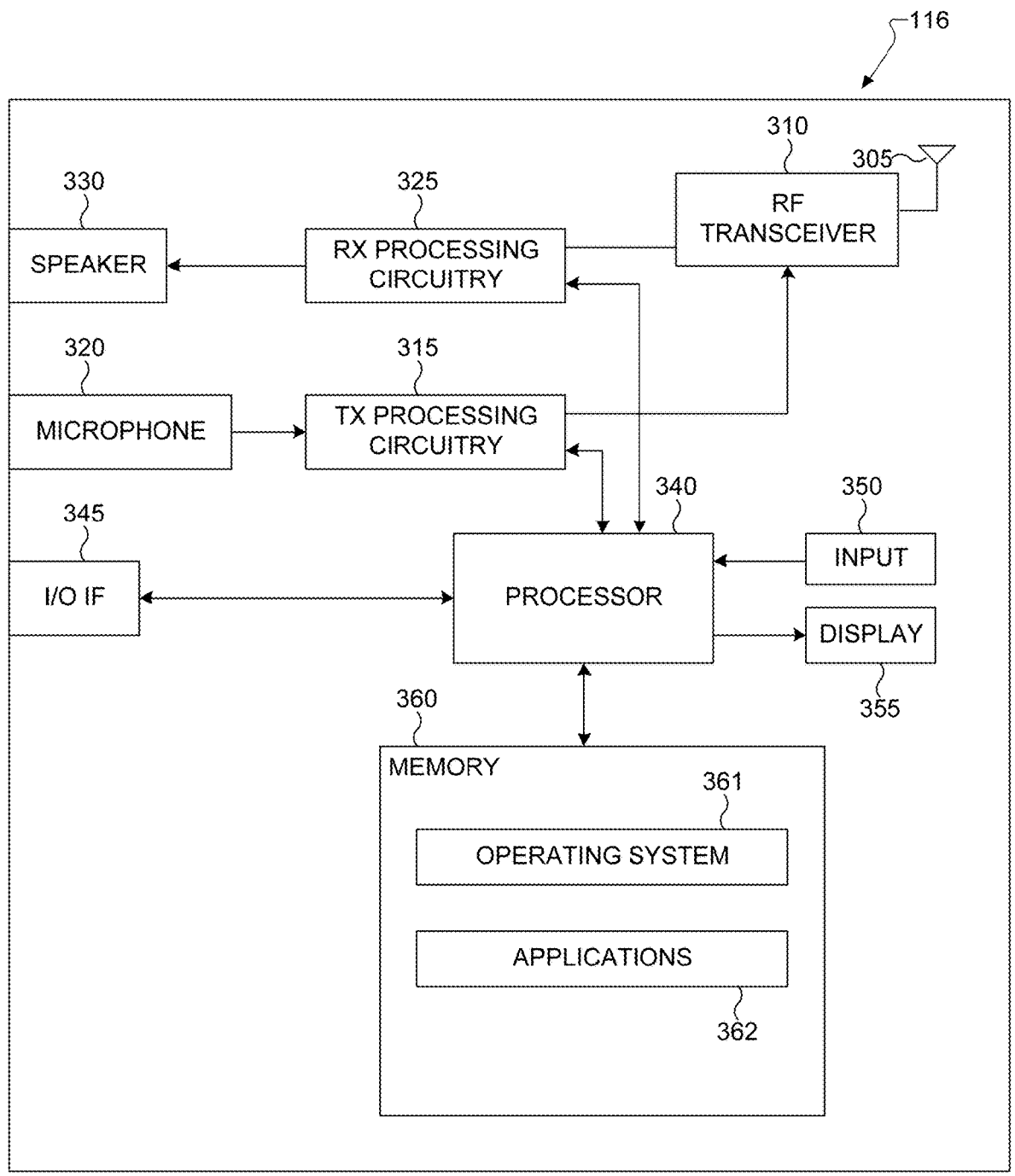
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
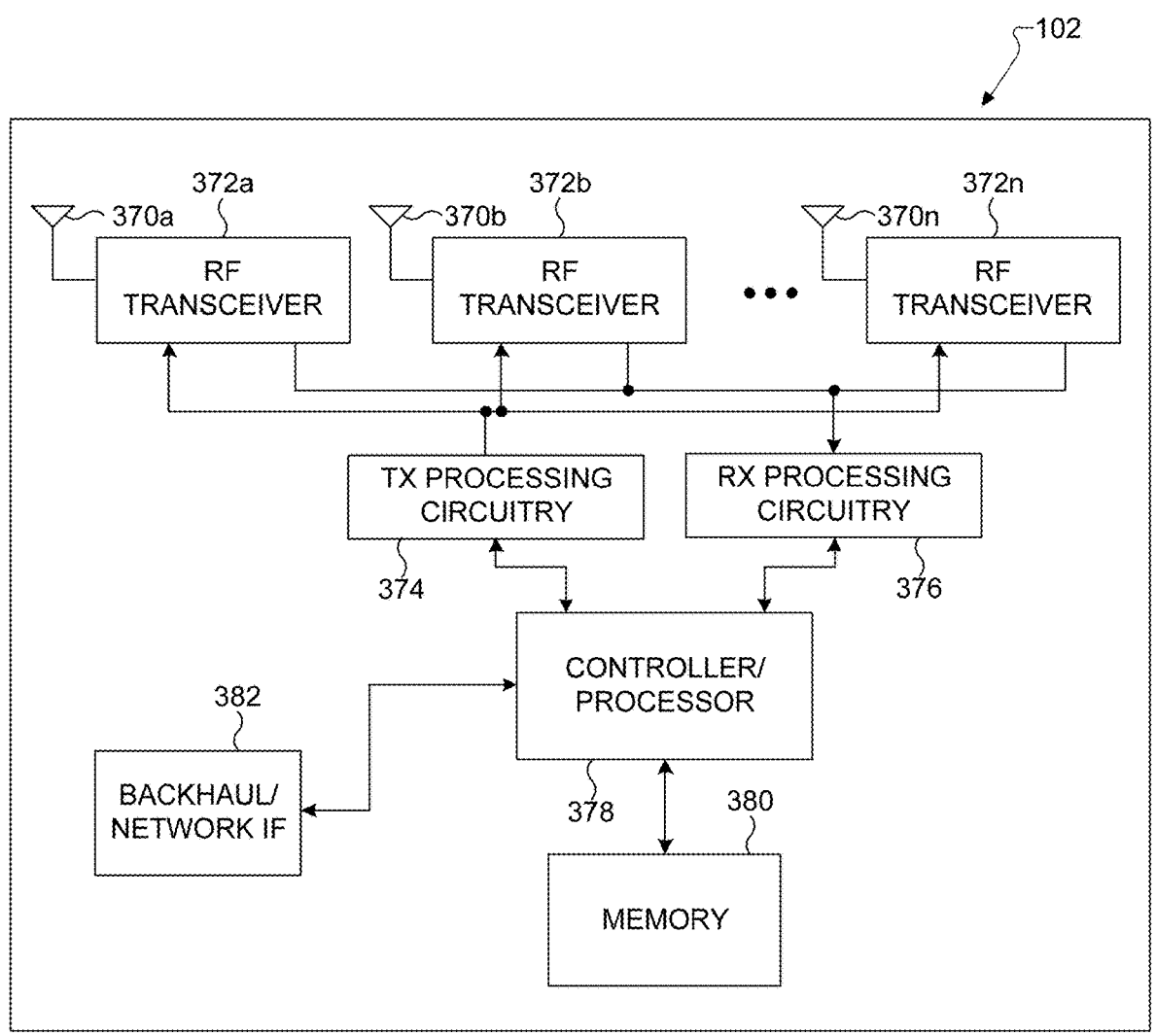
FIG. 3B illustrates an example base station (BS) according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G or new radio access technology or NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) perform configuration and signaling for CSI reporting.

Although FIG. 3B illustrates one example of a gNB 102, various changes can be made to FIG. 3B. For example, the gNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports that enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
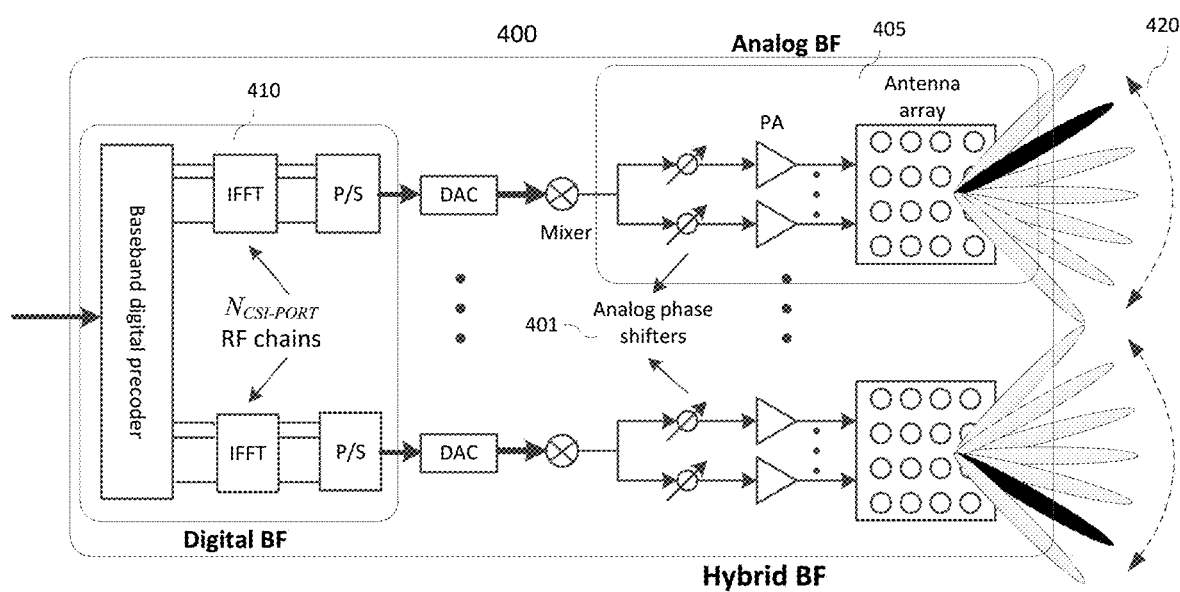
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements that can be controlled by a bank of analog phase shifters 401. One CSI-RS port can then correspond to one sub-array that produces a narrow analog beam through analog beamforming 405. This analog beam can be configured to sweep across a wider range of angles (420) by varying the phase shifter bank across symbols or subframes. The number of sub-arrays (equal to the number of RF chains) is the same as the number of CSI-RS ports $N_{CSI\_PORT}$. A digital beamforming unit 410 performs a linear combination across $N_{CSI\_PORT}$ analog beams to further increase precoding gain. While analog beams are wideband (hence not frequency-selective), digital precoding can be varied across frequency sub-bands or resource blocks.

To enable digital precoding, efficient design of CSI-RS is an important factor. For this reason, three types of CSI reporting mechanism corresponding to three types of CSI-RS measurement behavior are supported in Rel.13 LTE: 1) 'CLASS A' CSI reporting that corresponds to non-precoded CSI-RS, 2) 'CLASS B' reporting with K=1 CSI-RS resource that corresponds to UE-specific beamformed CSI-RS, 3) 'CLASS B' reporting with K>1 CSI-RS resources that corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (which includes multiple ports). Here, (at least at a given time/frequency) CSI-RS ports have narrow beam widths and hence not cell wide coverage, and (at least from the gNB perspective) at least some CSI-RS port-resource combinations have different beam directions.

In scenarios where DL long-term channel statistics can be measured through UL signals at a serving gNB, UE-specific BF CSI-RS can be readily used. This is typically feasible when UL-DL duplex distance is sufficiently small. When this condition does not hold, however, some UE feedback is used for the gNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In Rel.10 LTE, UL SU-MIMO transmission is supported using a codebook-based transmission scheme. That is, an UL grant (containing DCI format 4) includes a single PMI field (along with RI) that indicates the single precoding vector or matrix (from a predefined codebook) a UE shall use for the scheduled UL transmission. Therefore, when multiple PRBs are allocated to the UE, a single precoding matrix indicated by the PMI implies that wideband UL precoding is utilized. Despite its simplicity, this is clearly sub-optimal since typical UL channel is frequency-selective and a UE is frequency scheduled to transmit using multiple PRBs.

Yet another drawback of Rel.10 LTE UL SU-MIMO is its lack of support for scenarios where accurate UL-CSI is unavailable at the gNB (which is needed for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO should offer competitive performance even when accurate UL-CSI is unavailable at the gNB. Third, the proposed UL MIMO solution should be able to exploit UL-DL reciprocity where CSI-RS is utilized by the UE to provide UL-CSI estimation for TDD scenarios.

In the present disclosure, unless stated otherwise, the terms PMI (Precoding Matrix Indicator) and TPMI (transmit PMI) are used interchangeably to refer to an UL-related DCI field that indicates an assigned precoder or precoder group that a UE uses for a scheduled UL transmission. Likewise, unless stated otherwise, the terms RI (Rank Indicator) and TRI (transmit RI) are used interchangeably to refer to an UL-related DCI field that indicates an assigned number of layers that a UE uses for a scheduled UL transmission.

The present disclosure includes at least four components for enabling UL MIMO. A first component includes a method for configuring precoded UL transmission. A second component includes embodiments for supporting UL frequency-selective precoding. A third component includes a method for enabling reciprocity-based UL MIMO transmission. A fourth component includes a method for UL transmission with two waveforms. Names or terms used to represent functionality are example and can be substituted with other names or labels without changing the substance of this embodiment.

For the first component (that is, configuring precoded UL transmission), one example embodiment for facilitating operations in various scenarios, dynamic and semi-dynamic beamforming can be described as follows. In one embodiment, dynamic beamforming is especially applicable when accurate UL-CSI is available at a gNB or UE (for instance, low UE speeds and good cell isolation or inter-cell interference coordination). In this case, the UE can transmit data through a narrow directional beam since accurate directional information is accessible. For FDD, the gNB can signal a choice of beamforming or precoding vector/matrix (or vectors/matrices) to a UE via a DL control channel, such as an UL grant. Upon receiving such precoding information, the UE shall use the associated precoder or beamformer to transmit the requested UL data to the gNB. This precoding information is updated dynamically by the gNB.

To support dynamic beamforming, a codebook-based MIMO transmission can be used where an UL grant (containing a relevant DCI) includes a single precoding information (PMI) field (along with RI). This PMI indicates the single precoding matrix used by the UE for the scheduled UL transmission. Therefore, one precoder or beamformed is applied to all scheduled PRB s for that UE.

Semi-dynamic beamforming is especially applicable when UL-CSI quality is impaired at the gNB or UE (for instance, high UE speeds and poor cell isolation that causes bursty inter-cell interference known as the flash-light effect). In this case, it is more advantageous for the gNB to transmit data through a group of directional beams since the UE can only indicate an approximate (or a range of) directional information. For this purpose, precoder (beam) cycling within a group of beams either in time (across OFDM symbols) or frequency (either across REs, RBs, or groups of RBs) domain can be employed. This approximate directional information can be signaled to the UE via a DL control channel, such as an UL grant. This information can either be a type of long-term precoding information or an indicator of a subset of precoders.

For semi-dynamic beamforming, a set of multiple precoders is used in conjunction with a predetermined cycling pattern (or set of cycling patterns). Either the cycling pattern or the set of precoders can be specified and signaled to the UE via an UL grant. The PMI field used for dynamic beamforming can be extended to support semi-dynamic beamforming via precoder cycling. For rank-1 (one-layer) transmission, this semi-dynamic beamforming can be concatenated with transmit diversity such as SFBC or SFBC-FSTD applied to two or four beams where the number of beams can constitute to the number of UL antenna ports.

Figure 5:
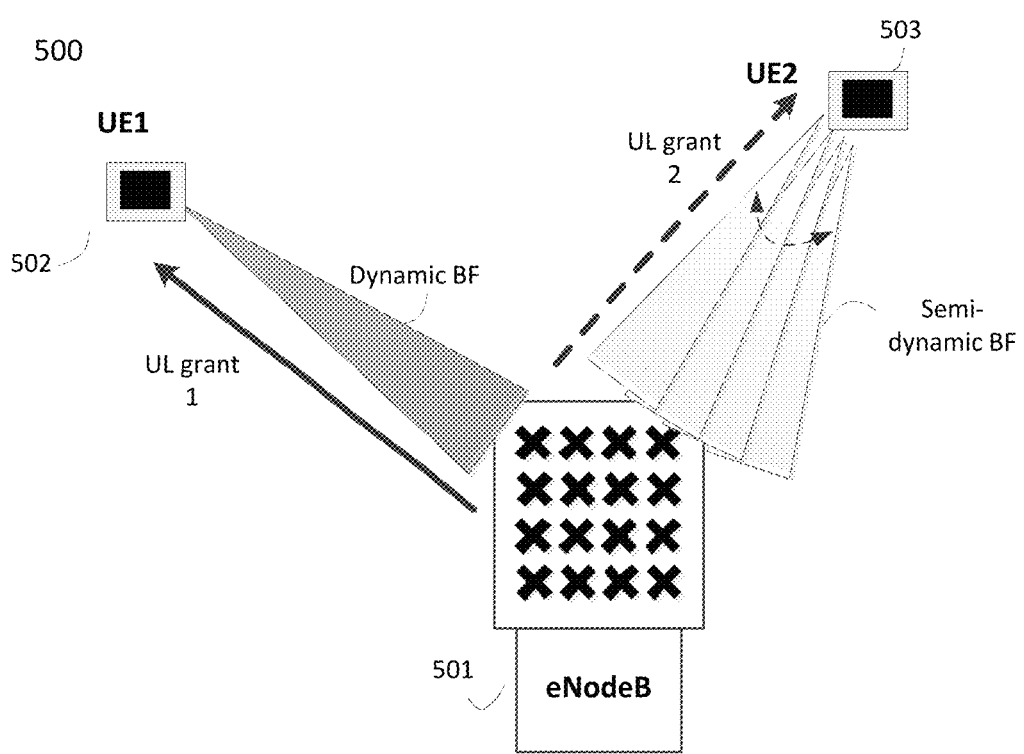
FIG. 5 illustrates an example operation of dynamic and semi-dynamic precoded transmission according to an embodiment of the present disclosure.

FIG. 5 describes an example operation 500 where UE1 502 and UE2 503 are connected with a gNB 501. The gNB schedules an UL transmission for the UE1 via an UL grant 1 and the UE2 via an UL grant 2. Upon receiving and successfully decoding the UL grant 1 that contains a grant for UE1 to transmit data using dynamic beamforming, UE1 transmits on the UL using dynamic beamforming. That is, UE1 precodes its data so that the data is transmitted via one narrow directional beam. The precoder used by UE1 is signaled via a PMI field in the UL grant 1. Upon receiving and successfully decoding the UL grant 2 that contains a grant for UE2 to transmit data using semi-dynamic beamforming, UE2 transmits on the UL using semi-dynamic beamforming. That is, UE2 precodes its data so that the data is transmitted via a plurality of directional beams where these four beams are cycled either in time (across OFDM symbols), frequency (across REs or RBs), or both time and frequency. In FIG. 5, four spatially overlapping beams are shown for illustrative purposes. The set of precoders used by UE1 or the use of four beams in a cycling manner is signaled via a PMI field in the UL grant 2.

In the present disclosure, the terms 'dynamic beamforming' and 'semi-dynamic beamforming' are used for illustrative purposes. Other terms can also be used to represent the same methods and/or functionalities. For example, terms such as 'transmission scheme 1 or A' and 'transmission scheme 2 or B'—or 'transmission mode 1' and 'transmission mode 2'—can be used to represent the two methods of transmission, respectively. These two transmission schemes can also be used together with other transmission schemes.

To configure a UE interchangeably with either dynamic or semi-dynamic beamforming as illustrated in FIG. 5, several optional embodiments are possible.

In a first embodiment, a UE is configured with either dynamic or semi-dynamic beamforming semi-statically via higher-layer (such as RRC) signaling. An example of this embodiment is to perform transmission scheme or transmission mode configuration via at least one RRC parameter. In this case, the value of the RRC parameter indicates whether the UE is configured with dynamic or semi-dynamic beamforming.

In this first embodiment, the PMI field that is a part of the DCI in the UL grant (previously mentioned above) can be used for both dynamic and semi-dynamic beamforming. The PMI field can signal different hypotheses depending on whether the UE is configured with dynamic or semi-dynamic beamforming. When the UE is configured with dynamic beamforming, the PMI field indicates the precoding matrix or vector the UE shall use for the granted UL data transmission. When the UE is configured with semi-dynamic beamforming, the PMI field can indicate the choice of a group of precoding matrices or vectors the UE shall use for the granted UL data transmission.

An example is given in TABLE 1-A where a set of length-M O-time oversampled DFT vectors is used as a set of possible rank-1 precoders for M antenna ports. Therefore, a set of (OM−1) precoding vectors is available. The RRC or higher-layer parameter indicating whether the UE is configured with dynamic or semi-dynamic beamforming is BeamformingScheme, as an example. When the parameter BeamformingScheme indicates 'Dynamic' (that is, dynamic beamforming), PMI=i indicates that the UE is requested to (shall) use precoder $v_i$ for UL data transmission. When the parameter BeamformingScheme indicates 'Semi-dynamic' (that is, semi-dynamic beamforming), PMI=i indicates that the UE is requested to (shall) use precoder group $G_i$ (which includes a group of B consecutive precoders) for UL data transmission. Optionally, a group of B non-consecutive precoders can also be used if the UL channel angular spread is large.

TABLE 1-A

Example PMI table for embodiment 1

| PMI value i | Precoder or precoder group | |
|---|---|---|
| | BeamformingScheme = 'Dynamic' | BeamformingScheme = 'Semi-dynamic' |
| 0 | $v_0$ | $G_0$ |
| 1 | $v_1$ | $G_1$ |
| 2 | $v_2$ | $G_2$ |
| ... | ... | ... |
| OM − 1 | $v_{OM-1}$ | $G_{OM-1}$ |

$$v_i = \frac{1}{\sqrt{M}} \times \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T \quad \text{(Equation 1)}$$

$$G_i = [\, v_i \quad v_{mod(i+1,OM)} \quad \cdots \quad v_{mod(i+B-2,OM)} \quad v_{mod(i+B-1,OM)} \,]$$

In a second embodiment, a UE is configured with either dynamic or semi-dynamic beamforming dynamically via an UL grant transmitted on a DL control channel.

One example of this second embodiment is to utilize one DCI parameter to indicate a choice of transmission scheme or mode (either dynamic or semi-dynamic) the UE shall use for the granted UL data transmission. In this example, the PMI field that is a part of the DCI in the UL grant can be used for both dynamic and semi-dynamic beamforming. Depending on the value of this DCI parameter (that is, whether the UE is configured with dynamic or semi-dynamic beamforming), a PMI field is also needed. This PMI field indicates the precoding matrix or vector the UE shall use for the granted UL data transmission when the UE is configured with dynamic beamforming. When the UE is configured with semi-dynamic beamforming, the PMI field can indicate the choice of a group of precoding matrices or vectors the UE shall use for the granted UL data transmission. This example can be described similarly to TABLE 1A. But in this case, the higher-layer parameter BeamformingScheme can be replaced with a DCI field BeamformingScheme that takes value of 0 (representing, for example, semi-dynamic beamforming) or 1 (representing, for example, dynamic beamforming).

Another example of this second embodiment is to utilize only one PMI field that is a part of the DCI in the UL grant. In this case, given a total of $N_H$ possible hypotheses associated with the B-bit PMI field (where $N_H \leq 2^B$), some $N_{H,d}$ of the $N_H$ hypotheses can be utilized for indicating precoder selection for dynamic beamforming while the rest ($N_{H,sd} = N_H - N_{H,d}$ hypotheses) can be utilized for indicating the selected group of precoders for semi-dynamic beamforming. This example can be described in TABLE 1-B. Compared to TABLE 1-A, TABLE 1-B combines the hypotheses from dynamic and semi-dynamic beamforming into one set indicated by the PMI field. For this example, the number of hypotheses associated with the PMI field is twice the number associated with the PMI field in the first example of the second embodiment as well as the first embodiment.

TABLE 1-B

Example PMI table for embodiment 2 (second example)

| | Interpretation | |
|---|---|---|
| PMI value i | Beamforming scheme | Precoder or precoder group |
| 0 | Dynamic | Precoder $v_0$ |
| 1 | Dynamic | Precoder $v_1$ |
| 2 | Dynamic | Precoder $v_2$ |
| ... | ... | ... |
| OM − 1 | Dynamic | Precoder $v_{OM-1}$ |
| OM | Semi-dynamic | Precoder group $G_0$ |
| OM + 1 | Semi-dynamic | Precoder group $G_1$ |
| OM + 2 | Semi-dynamic | Precoder group $G_2$ |
| ... | ... | ... |
| 2OM − 1 | Semi-dynamic | Precoder group $G_{OM-1}$ |

$$v_i = \frac{1}{\sqrt{M}} \times \begin{bmatrix} 1 & e^{j\frac{2\pi i}{OM}} & e^{j\frac{4\pi i}{OM}} & \ldots & e^{j\frac{2\pi(M-1)i}{OM}} \end{bmatrix}^T \quad \text{(Equation 2)}$$

$$G_i = [\, v_i \quad v_{mod(i+1,OM)} \quad \cdots \quad v_{mod(i+B-2,OM)} \quad v_{mod(i+B-1,OM)} \,]$$

Optionally, two-dimensional precoder or codebook (especially relevant for two-dimensional or rectangular array geometries) can be utilized. In this case, a precoder can correspond to a pair of indices ($m_1$, $m_2$), each representing one of the two dimensions. An example rank-1 precoder analogous to the above can be described in Equation 3 (where $v_1$ and $G_1$ are defined in Equation 2). Here $M_1$ and $M_2$ denote the number of ports in a first and a second dimension, respectively. Likewise, $O_1$ and $O_2$ denote the oversampling factor in a first and a second dimension, respectively.

$$v_{m_1,m_2} = \frac{1}{\sqrt{M_1 M_2}} \times \begin{bmatrix} 1 & e^{j\frac{2\pi m_1}{O_1 M_1}} & e^{j\frac{4\pi m_1}{O_1 M_1}} & \ldots & e^{j\frac{2\pi(M-1)m_1}{O_1 M_1}} \end{bmatrix}^T \otimes \quad \text{(Equation 3)}$$

$$\begin{bmatrix} 1 & e^{j\frac{2\pi m_2}{O_2 M_2}} & e^{j\frac{4\pi m_2}{O_2 M_2}} & \ldots & e^{j\frac{2\pi(M-1)m_2}{O_2 M_2}} \end{bmatrix}^T$$

$$= v_{m_1} \otimes v_{m_2}$$

$$G_{m_1,m_2} = G_{m_1} \otimes G_{m_2}$$

$$G_{m_i}[\, v_{m_i} \quad v_{mod(m_i+1,O_i M_i)} \quad \cdots \quad v_{mod(m_i+B_i-2,O_i M_i)} \quad v_{mod(m_i+B_i-1,O_i M_i)} \,]$$

Optionally, one-dimensional precoder or codebook designed for dual-polarized array configurations can also be utilized. In this case, a precoder with two identical parts (each part associated with one polarization group) and co-phasing between two polarization groups can be used. An example one-dimensional 2M-port (each of the two polarization groups including M ports) rank-1 precoder analogous to the above can be described in Equation 4. Here, K possible values of co-phasing are used.

$$v_{i,k} = \frac{1}{\sqrt{2M}} \times \begin{bmatrix} d_i \\ e^{j\phi_k} d_i \end{bmatrix} \quad \text{(Equation 4)}$$

$$d_i = \begin{bmatrix} 1 & e^{j\frac{2\pi i}{OM}} & e^{j\frac{4\pi i}{OM}} & \ldots & e^{j\frac{2\pi(M-1)i}{OM}} \end{bmatrix}^T$$

$$G_m =$$
$$[\, v_m \quad v_{mod(m+1,OM)} \quad \cdots \quad v_{mod(m+B-2,OM)} \quad v_{mod(m+B-1,OM)} \,],$$

$$m = (K-1)i + k$$

Optionally, two-dimensional precoder or codebook designed for dual-polarized array configurations can also be utilized. An example two-dimensional $2M_1M_2$-port (each of the two polarization groups including $M_1M_2$-ports) rank-1 precoder analogous to the above can be described in Equation 5. The group of beams can be defined similarly in terms of the three indices $m_1$, $m_2$, k of that the single PMI is composed.

$$v_{m_1,m_2,k} = \frac{1}{\sqrt{2M_1 M_2}} \times \begin{bmatrix} d_{m_1} \otimes d_{m_2} \\ e^{j\phi_k} d_{m_1} \otimes d_{m_2} \end{bmatrix} \quad \text{(Equation 5)}$$

$$d_{m_1} = \begin{bmatrix} 1 & e^{j\frac{2\pi m_1}{O_1 M_1}} & e^{j\frac{4\pi m_1}{O_1 M_1}} & \ldots & e^{j\frac{2\pi(M-1)m_1}{O_1 M_1}} \end{bmatrix}^T$$

$$d_{m_2} = \begin{bmatrix} 1 & e^{j\frac{2\pi m_2}{O_2 M_2}} & e^{j\frac{4\pi m_2}{O_2 M_2}} & \ldots & e^{j\frac{2\pi(M-1)m_2}{O_2 M_2}} \end{bmatrix}^T$$

With any of the above codebook options, the DL signaling embodiments to support switching between dynamic beamforming and semi-dynamic beamforming is applicable and can be extended in a straightforward manner (since each precoder or codebook corresponds to a single PMI).

For the second component (that is, supporting UL frequency selective precoding), in the above embodiments pertaining to the first component, a single precoder is indicated to a UE to be used for UL transmission. Therefore, for a single allocation, the same precoder is applied to all the allocated RBs. Optionally, subband precoding can also be supported by signaling one PMI per subband via an UL grant where one subband can include a plurality of contiguous RBs. In this case, the DCI field containing precoding information includes multiple PMIs, each associated with one subband and indicating the choice of precoder from a predetermined codebook.

Figure 6:
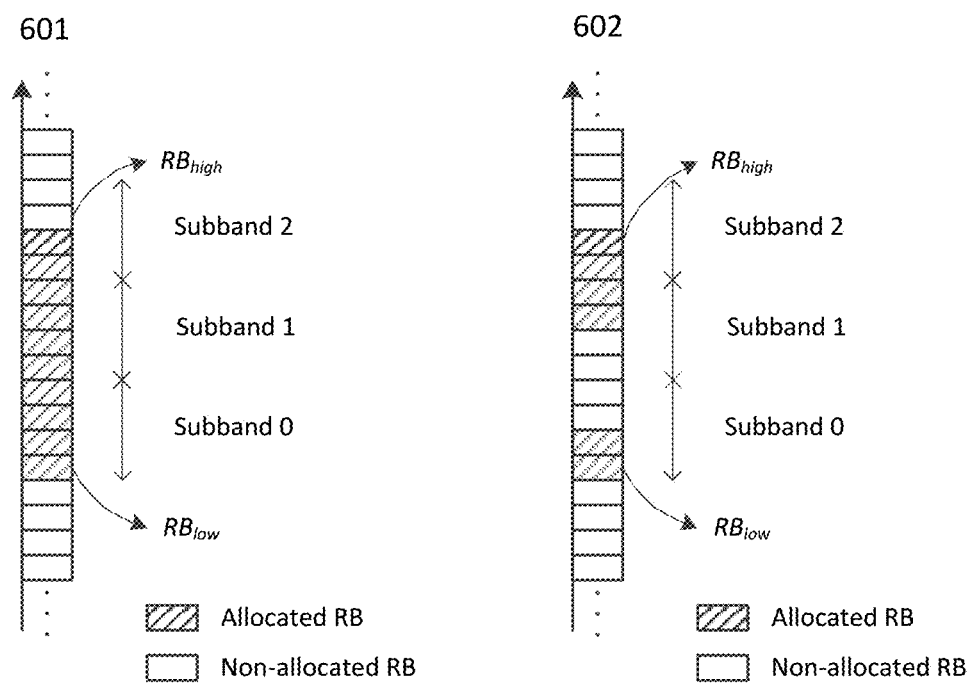
FIG. 6 illustrates an example downlink (DL) signaling for subband precoding and a UE procedure to interpret the precoding information DCI field according to an embodiment of the present disclosure.

FIG. 6 illustrates an example DL signaling for subband precoding and UE procedure to interpret the precoding information DCI field that contains $N_{PMI}$ PMIs (each associated with one subband). The number of PMIs $N_{PMI}$ is interdependent with the subband size $P_{SUBBAND}$ of RBs. For a given UL resource allocation span (expressed in terms of the number of RBs $RA_{RB}$), the number of PMIs can be derived as follows:

$$N_{PMI} = \left\lceil \frac{RA_{RB}}{P_{SUBBAND}} \right\rceil.$$

Therefore, for a given UE resource allocation, the number of PMIs does not directly depend on the number of RBs allocated to the UE since UL resource allocation can include a plurality of contiguous RBs (as illustrated in 601) or clustered RBs (as illustrated in 602). Instead, it depends on the number of RBs starting from the lowest-indexed to the highest-indexed RBs within the associated UE resource allocation. Denoting the lowest-indexed and the highest-indexed RBs as $RB_{low}$ and $RB_{high}$, respectively, $$N_{PMI} = \left\lceil \frac{RA_{RB}}{P_{SUBBAND}} \right\rceil = \left\lceil \frac{RB_{high} - RB_{low} + 1}{P_{SUBBAND}} \right\rceil.$$

Optionally, $$N_{PMI} = \left\lceil \frac{RA_{RB,1}}{P_{SUBBAND}} \right\rceil + \ldots + \left\lceil \frac{RA_{RB,N}}{P_{SUBBAND}} \right\rceil$$

where $RA_{RB,i}$ is the number of RBs in the i-th cluster, can also be used. The two examples given in FIG. 6 represent contiguous resource allocation (601) and clustered resource allocation (602). Here $P_{SUBBAND}=4$ is used for illustrative purposes. Although the total number of allocated RBs in 602 is smaller than that in 601, the total number of subbands, hence the number of PMIs $$\left( N_{PMI} = \left\lceil \frac{10}{4} \right\rceil = 3 \right)$$

is the same since the DL allocation span is the same for 601 and 602.

Figure 7:
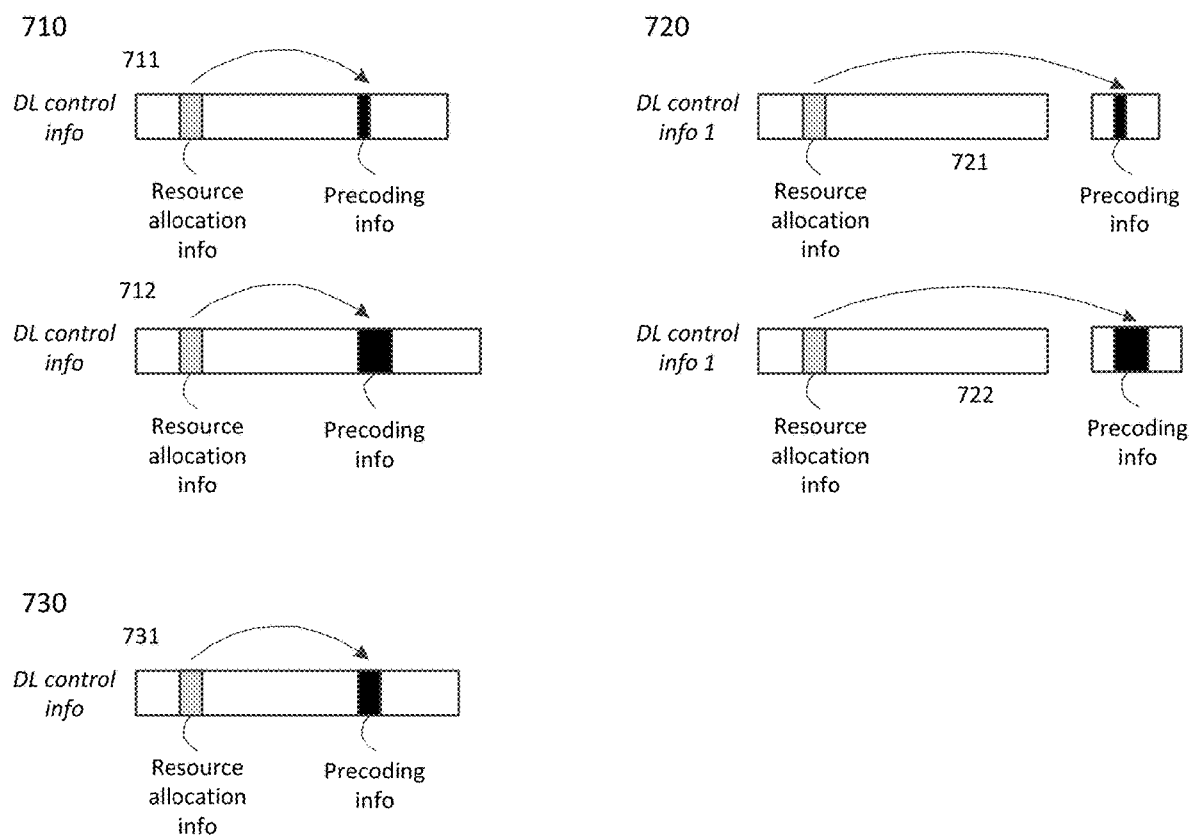
FIG. 7 illustrates several example DL signaling schemes for supporting subband precoding according to some embodiments of the present disclosure.

There are several DL signaling embodiments for supporting subband precoding as illustrated in FIG. 7. The following examples differ in several aspects such as whether the associated DCI payload size is fixed or varied with the number of subbands corresponding to the allocated RBs (hence the number of subband PMIs), whether all the PMI components are included in the DCI or at least some PMI components are signaled outside the DCI (or primary DCI), and/or whether the number of subbands corresponding to the allocated RBs (hence the number of subband PMIs) is fixed or varied depending on UL resource allocation. When the number of subband PMIs is fixed, PMI granularity (subband size) varies depending on UL resource allocation. Conversely, when PMI granularity (subband size) is fixed, the number of subband PMIs caries depending on UL resource allocation.

In a first embodiment 1, as illustrated by DCIs 710, a variable-length precoding information DCI fields 711 and 712 that includes $N_{PMI}$ PMIs (each associated with one subband) are used. In this case, the subband size (the number of RBs per subband) is fixed. The number of PMIs $N_{PMI}$ depends on the allocation size as well as the locations of allocated RBs (for instance, whether the allocated PRBs are contiguous or clustered). Consequently, the size of DCI associated with the UL grant is variable as well (depending on the number of subbands). This increases the number of blind decoding attempts at the UE. As illustrated by DCIs 710 of FIG. 7, the length of precoding information DCI fields 711 and 712 scales depending on the number of PMIs inferred from resource allocation information where DCI field 712 represents resource allocation that requires more PMIs than DCI field 711 (such as the case where more RBs are allocated for DCI field 712 compared to DCI field 711).

In a second embodiment 2, as illustrated by DCIs 720, a second (or second-level) DL control information containing at least precoding information ($N_{PMI}$ PMIs) required to support subband precoding is used. In this case, the subband size (the number of RBs per subband) is fixed. The location and size of this precoding information can be made dependent on the resource allocation indicated in an associated UL grant. In this case, the UE first receives the UL grant and decodes the DCI field that indicates resource allocation. Upon decoding resource allocation information, the UE decodes the second DL control information that contains only precoding information. This precoding information indicates the precoder that the UE uses for each group of RBs (subband) and hence for each RB allocated for the UE. The length precoding information DCI field that includes $N_{PMI}$ PMIs is variable and can be inferred from resource allocation information from the first DL control information. Therefore, the number of blind decoding attempts associated with the first DL control information is not increased.

In this embodiment, the first DL control information can be transmitted via L1 DL control channel (analogous to LTE PDCCH or ePDCCH) using C-RNTI or UE ID. The second DL control information can be transmitted separately from the first DL control information wherein its transmission parameters such as its location (in time and/or frequency domain) and/or payload size and/or MCS can be inferred from the first DL control information, either implicitly (e.g. from C-RNTI and/or some other UE-specific parameter) or explicitly (indicated in the first DL control information as a DCI field). For the second DL control information, C-RNTI or UE ID can either be used or not used. As illustrated by DCIs 720 of FIG. 7, the length of precoding information DCI field scales depending on the number of subband PMIs inferred from resource allocation information where DCI field 722 represents resource allocation that requires more PMIs than DCI field 721 (such as the case where more RBs are allocated for DCI field 722 compared to DCI field 721). Unlike the first embodiment, as illustrated by DCIs 710, however, the length of the first DL control information that contains resource allocation information remains the same while the length of the second DL control information varies depending on the required number of subband PMIs.

The second DL control information can be transmitted either via an L1 DL control channel (for example, that analogous to LTE PDCCH or ePDCCH—hence can be perceived as a second-level DCI) or as a part of resources/channel used for DL data transmission (such as analogous to LTE PDSCH). It can be located either in the same slot/subframe as, or a different slot/subframe from, the slot/subframe where the DCI (or first-level DCI, hence the UL grant) is transmitted. Regardless whether this second DL control information is transmitted in the form of a second-level DCI or DL data channel transmission (analogous to LTE PDSCH), CRC can be attached to its information bits to facilitate error detection at the UE.

In a third embodiment 3, as illustrated by DCI 730), a fixed-length precoding information DCI field 731 that includes a fixed number of PMIs $N_{PMI}>1$ (each associated with one subband) is used. Therefore, only a single value of $N_{PMI}$ is allowed. In this case, the subband size (the number of RBs per subband) can be variable, depending on resource allocation (the allocation size as well as the locations of allocated RBs).

For example, with $N_{PMI}=2$, only two PMIs (hence two separate precoders) can be assigned to the UE. The first PMI indicates the precoder associated with a first subset of allocated RBs and the second PMI with a second subset of allocated RBs different from the first subset—where the first and the second subsets, combined together, constitute to all the RBs allocated to the UE. The number of allocated RBs for each of the two subsets is thus variable (depending on the resource allocation). Consequently, the size of DCI associated with the UL grant is fixed and the number of RBs associated with each of the two PMIs is variable. In this case, the number of blind decoding attempts associated with the first DL control information is not increased. As illustrated by DCI 730 of FIG. 7, the length of precoding information DCI field remains the same since a fixed number of PMIs is used for any resource allocation (that is, the number of allocated RBs and/or the locations of allocated RBs).

For the third embodiment, several sub-embodiments pertaining to the interpretation of each PMI along with the associated subband size can be described as follows.

In a first sub-embodiment, the set/subset of RBs associated with each of $N_{PMI}$ subbands varies as resource allocation (that is, the number of allocated RBs and/or the locations of allocated RBs) varies. However, for a given/fixed resource allocation, the set/subset of RBs associated with each of $N_{PMI}$ subbands is fixed, predetermined, or configured via higher-layer signaling. This can be, for example, illustrated in FIG. 6. That is, for a given number and/or location of RBs indicated in the UL resource allocation (RA) field, each subband constitutes to a same number and/or subset of PRBs. Thus, there is no need for any additional indication in the associated UL-related DCI or via any other DL signaling mechanism.

In a second sub-embodiment, the subband associated with the i-th PMI (PMI, where i=0, 1, . . . , $N_{PMI}$-1) can be changed and therefore dynamically signaled via the UL-related DCI. In this case only the subbands for ($N_{PMI}$-1) PMIs need to be signaled since the subband for the one remaining PMI can be derived from the RA field and the rest of ($N_{PMI}$-1) subbands. Therefore, in addition to $N_{PMI}$ PMIs/TPMIs, ($N_{PMI}$-1) additional fields (each of which indicating the subband associated with ($N_{PMI}$-1) PMIs) are signaled via the UL-related DCI. For example, with $N_{PMI}$=2, one additional subband indicator field (either for the first or the second PMI) is signaled via UL-related DCI. In one variation of this sub-embodiment, one of the two PMIs (denoted as $PMI_{SB,1}$) can indicate a precoder only for the RB(s) indicated in the additional subband indicator field (for example, interpreted as analogous to the 'best-M' subbands wherein the value of M can be dynamically signaled as a part of the additional subband indicator field or via MAC CE, else semi-statically configured via higher-layer signaling) whereas the other PMI (denoted as $PMI_{SB,2}$) can indicate a wideband precoder that can be used for all the allocated RBs (indicated in the resource allocation DCI field). In another variation of this sub-embodiment, one of the two PMIs (denoted as $PMI_{SB,1}$) can indicate a precoder only for the RB(s) indicated in the additional subband indicator field (for example, interpreted as analogous to the 'best-M' subbands wherein the value of M can be dynamically signaled as a part of the additional subband indicator field or via MAC CE, else semi-statically configured via higher-layer signaling) whereas the other PMI (denoted as $PMI_{SB,2}$) can indicate a precoder for the remaining allocated RBs (indicated in the resource allocation DCI field).

To avoid any variation in DCI size which could increase the number of UE blind decodes of DL control signaling, the size of the additional subband indicator field can be fixed or configured via higher-layer signaling. Therefore, the number of hypotheses (or, furthermore, the set of hypotheses) associated with the subband indicator field can either be fixed or configured via higher-layer signaling. For example, to keep the number of subband hypotheses for $PMI_{SB,2}$ to a maximum of $N_{HYP}$, when $N_{RB}$ RBs are allocated to the UE (as indicated in the resource allocation DCI field), the number of possible subbands (subsets of $N_{RB}$ RBs) can be fixed or higher-layer configured to be no more than $N_{HYP}$. If each of these possible subbands is of the same size in terms of the number of RBs and the RBs within each subset are as contiguous as possible, each of the possible subbands can include approximately $$\left\lfloor \frac{N_{RB}}{N_{HYP}} \right\rfloor$$

RBs.

In a fourth embodiment 4, the precoding information DCI field can contain a maximum of K possible values of the number of PMIs $N_{PMI}$. This embodiment can be perceived as the middle ground between embodiment 1 and embodiment 3. In this case, the subband size (the number of RB s per subband) can be variable, depending on resource allocation (the allocation size as well as the locations of allocated RBs). For example, with K=2 and $N_{PMI} \in \{1,2\}$, the precoding information DCI field can contain either 1 PMI or 2 PMIs. When the precoding information DCI field contains 1 PMI, the UE shall use the precoder indicated by the PMI for all its allocated RBs. When the precoding information DCI field contains 2 PMIs, the first PMI indicates the precoder associated with a first subset of allocated RB s and the second PMI with a second subset of allocated RBs different from the first subset—where the first and the second subsets, combined together, constitute to all the RBs allocated to the UE. The number of allocated RBs for each of the two subsets is thus variable (depending on the resource allocation).

Consequently, the size of DCI associated with the UL grant is variable (can be one of two possible sizes) and the number of RBs associated with a PMI is variable. This increases the number of blind decoding attempts at the UE but only by a factor of 2. Embodiment 4 can be illustrated in a similar manner to DCIs 710 of FIG. 7, except that there are only two possible lengths of precoding information (associated with two values of $N_{PMI}$).

For any of the above example embodiments for supporting subband precoding, especially for embodiment 2 (DCIs 720 of FIG. 7) wherein a second DL control information containing subband PMIs is used, one extra hypothesis that indicates that the UE can assume the previously (or most recently) signaled precoding information (including PMIs, either a wideband component or subband components) for the granted UL transmission can be included in the DCI (or first-level DCI). This hypothesis can also indicate that the same precoder(s) (wideband and/or subband) as signaled in the previously (or most recently) granted UL transmission can be used.

Several options for signaling this extra hypothesis are possible. First, this hypothesis can be associated with one code point of any other existent UL-related DCI field. This is relevant, for instance, when no precoding information is included in the DCI (or first-level DCI). Some example DCI fields include Resource Allocation, a DCI field indicating transmission scheme, or UL DMRS Information. Second, a dedicated 1-bit DCI field that indicates whether a second DL control information containing precoding information (such as subband PMIs) exists or not. Third, when dual-stage codebook is used (described later in the present disclosure), the wideband (first-stage) PMI component can be included in the DCI (or first-level DCI) and signaled as a first-PMI DCI field. In this case, this extra hypothesis can be included as one code point of the first-PMI DCI field.

Therefore, when this extra hypothesis is detected at the UE, the UE does not attempt to decode a second DL control information that includes subband PMIs and assumes the previously (most recently) signaled and received precoding information. This scheme facilitates DL control overhead saving since the second DL control information (which can include subband PMIs) is not signaled, for example, when the gNB/network sees no need for change in UL precoders.

Figure 8:
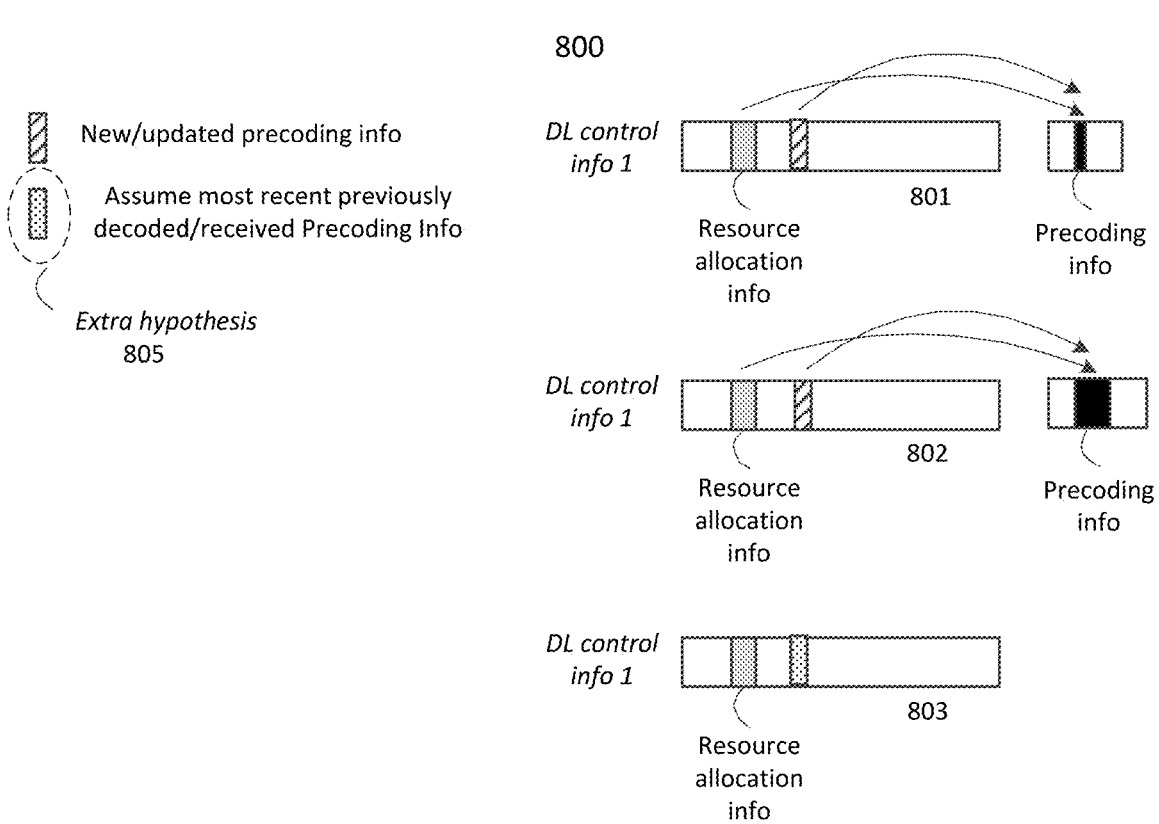
FIG. 8 illustrates another example DL signaling scheme for supporting subband precoding according to an embodiment of the present disclosure.

A variation of embodiment 2 (DCIs 720 of FIG. 7) wherein the above extra hypothesis is used can be illustrated in 800 of FIG. 8. In this illustrative example, the extra hypothesis 805 is signaled as one of the two-value information included in the DCI 801 (DL control info 1). As previously disclosed, other options can be used. When this extra hypothesis is signaled (in DCI field 803), the second DL control information (denoted as Precoding info, which includes subband PMIs) is not signaled. Therefore, upon detecting hypothesis 805, the UE can assume the precoders (PMIs) signaled in the most recent previously decoded/received Precoding info (e.g. from the most recently decoded/received UL grant). Else, new/updated Precoding info is signaled. In this case, the UE shall receive/decode the second DL control information that includes Precoding info based on the decoded UL resource allocation in the DCI 802 or 803.

Any of the above embodiments for supporting subband precoding is applicable for dynamic beamforming hence can be combined with a mechanism for semi-dynamic beamforming (such as the ones exemplified in TABLEs 1-A and 1-B). That is, dynamic beamforming can be associated with a DL control signaling mechanism for subband precoding while semi-dynamic beamforming with a DL control mechanism for indicating a group of precoders for the purpose of precoder/beamformer cycling.

In addition, when dynamic and semi-dynamic beamforming can be configured dynamically for a UE, it is also possible to configure a UE with either a single precoder for all the allocated RBs ("wideband" precoding) or a subband precoding via higher-layer (RRC) signaling. In this case, an RRC parameter is used to configure the UE with either "wideband" precoding (single precoder for all the allocated RBs) or subband precoding (possibly a plurality of precoders, each for a subset of the allocated RBs). For example, a two-valued RRC parameter SubbandPrecodingEnabled can be used. When its value is 'TRUE' or 'ON', the UE is configured with subband precoding. In this case, a plurality of PMIs (including one PMI, depending on the embodiment) according to one of the four aforementioned embodiments for subband precoding can be used. When its value is 'FALSE' or 'OFF', the UE is configured with "wideband" precoding. In this case, one PMI is used regardless of UE resource allocation.

The above example embodiments on the signaling support to facilitate switching between dynamic and semi-dynamic beamforming as well as embodiments for supporting subband precoding are applicable not only with a single-stage precoder structure (and hence a single-stage codebook), but also with a dual-stage precoder structure (and hence a dual-stage codebook).

For the third component (that is, embodiments with dual-stage codebook based on dual-stage precoder), a precoding vector or matrix is associated with two indices (for example, $i_1$ and $i_2$) where a first index indicates a wideband component and a second index a possibly subband component. An example of such a precoder structure is $v_{i_1,i_2} = u_{i_1} w_{i_2}$ (similar to Rel.12 LTE DL MIMO codebook) where $U_{i_1}$ is wideband (that is, a single stage-one precoder $u_{i_1}$, hence also $i_1$, is used for all the allocated RBs) and $w_{i_2}$ can be either wideband or subband (that is, a single stage-two precoder $w_{i_2}$, hence also $i_2$, can be used for different allocated RBs) depending on whether "wideband" precoding or subband precoding is configured for the UE. This pair of indices ($i_1,i_2$) corresponds to a precoder (either vector or matrix) in a configured precoding codebook. The first precoder $u_{i_1}$ (along with its associated PMI value $i_1$) can correspond to a group of precoders where the second precoder $w_{i_2}$ (along with its associated PMI value $i_2$) can correspond to either a selection and a linear combination of the group of precoders in $u_{i_1}$. In case of dual-polarized antenna, the second precoder with $w_{i_2}$ (along with its associated PMI value $i_2$) can also contain a co-phasing operation between two polarization groups.

Furthermore, a two-dimensional dual-stage precoder or codebook (especially relevant for two-dimensional or rectangular array geometries) can be utilized. In this case, the first PMI value $i_1$ can be composed of two indices ($i_{1,1}, i_{1,2}$), each corresponding to one of the two dimensions. Therefore, a corresponding precoder structure can be written as $v_{i_1,i_2} = u_{i_1} w_{i_2} = u_{i_{1,1},i_{1,2}} w_{i_2}$ (similar to Rel.13 LTE DL MIMO codebook). Here $u_{i_{1,1},i_{1,2}}$ is wideband (that is, a single stage-one precoder $u_{i_{1,1},i_{1,2}}$, hence also ($i_{1,1}, i_{1,2}$), is used for all the allocated RBs) and $w_{i_2}$ can be either wideband or subband (that is, a single stage-two precoder $w_{i_2}$, hence also $i_2$, can be used for different allocated RB s) depending on whether "wideband" precoding or subband precoding is configured for the UE. This group of indices ($i_{1,1}, i_{1,2}, i_2$) corresponds to a precoder (either vector or matrix) in a configured precoding codebook. The first precoder $U_{i_{1,1},i_{1,2}}$ (along with its associated PMI value ($i_{1,1}, i_{1,2}$)) can correspond to a group of precoders where the second precoder $w_{i_2}$ (along with its associated PMI value $i_2$) can correspond to either a selection and a linear combination of the group of precoders in $U_{i_{1,1},i_{1,2}}$. In case of dual-polarized antenna, the second precoder $w_{i_2}$ (along with its associated PMI value $i_2$) can also contain a co-phasing operation between two polarization groups.

The following embodiments for dual-stage precoder or codebook apply to both one- or two-dimensional precoder. For two-dimensional precoder or codebook structure, the first PMI value $i_1$ can be composed of two indices ($i_{1,1}, i_{1,2}$). Therefore, the first-stage precoder can be associated with these two indices: $u_{i_1} = u_{i_{1,1},i_{1,2}}$.

For example, to configure a UE interchangeably with either dynamic or semi-dynamic beamforming for dual-stage precoder, several optional embodiments analogous to the above embodiments and examples for single-stage precoder are possible. For dual-stage precoder or codebook, the pair of PMI values ($i_1$, $i_2$) (or ($i_{1,1},i_{1,2},i_2$) for two-dimensional precoder) can offer a natural support for both dynamic and semi-dynamic beamforming. When dynamic beamforming is configured, the PMI signaled to a UE includes both $i_1$ (which is composed of ($i_{1,1}, i_{1,2}$) for two-dimensional codebook) and $i_2$. When semi-dynamic beamforming is configured, the PMI signaled to a UE includes only $i_1$ (which is composed of ($i_{1,1}, i_{1,2}, i_2$) for two-dimensional precoder). The value of the second precoder $w_{i_2}$ (along with its associated PMI value $i_2$) indicates a group of precoder across that the UE shall perform a cycling for its UL data transmission.

In a first embodiment, a UE is configured with either dynamic or semi-dynamic beamforming semi-statically via higher-layer (such as RRC) signaling. An example of this embodiment is to perform transmission scheme or transmission mode configuration via at least one RRC parameter. In this case, the value of the RRC parameter indicates whether the UE is configured with dynamic or semi-dynamic beamforming.

In this first embodiment, the PMI field that is a part of the DCI in the UL grant (previously mentioned above) can be used for both dynamic and semi-dynamic beamforming. The PMI field can signal different hypotheses depending on whether the UE is configured with dynamic or semi-dynamic beamforming (that is, depending on the setting of the higher-layer parameter that indicates whether the UE is configured with dynamic or semi-dynamic beamforming, or more generally, the first or the second transmission scheme). When the UE is configured with dynamic beamforming, the PMI field indicates the precoding matrix or vector the UE shall use for the granted UL data transmission. In this case, the PMI field i includes two indices $i_1$ (which is composed of ($i_{1,1}$, $i_{1,2}$ for two-dimensional codebook) and $i_2$ of a codebook. When the UE is configured with semi-dynamic beamforming, the PMI field i can indicate the choice of a group of precoding matrices or vectors the UE shall use for the granted UL data transmission. In this case, the PMI field i includes only $i_1$ of the same codebook.

For example, an RRC or higher-layer parameter BeamformingScheme is used to indicate whether the UE is configured with dynamic or semi-dynamic beamforming. When the parameter BeamformingScheme indicates 'Dynamic' (that is, dynamic beamforming), PMI=($i_1$, $i_2$) indicates that the UE is requested to (shall) use precoder $v_{i_1,i_2}$ for UL data transmission. The PMI pair can either be jointly encoded into one PMI parameter i or be separately indicated as two parameters. When the parameter BeamformingScheme indicates 'Semi-dynamic' (that is, semi-dynamic beamforming), PMI=$i_1$ indicates that the UE is requested to (shall) use precoder group associated with $i_1$ (for example, $u_{i_1}$) for UL data transmission. For two-dimensional codebook, $i_1$ is composed of ($i_{1,1}$,$i_{1,2}$).

In addition, when dynamic and semi-dynamic beamforming can be configured semi-statically for a UE via higher-layer signaling, it is also possible to configure a UE with either a single precoder for all the allocated RB s ("wideband" precoding) or a subband precoding via higher-layer (RRC) signaling. In this case, an RRC parameter is used to configure the UE with either "wideband" precoding (single precoder for all the allocated RB s) or subband precoding (possibly a plurality of precoders, each for a subset of the allocated RBs). For example, a two-valued RRC parameter SubbandPrecodingEnabled can be used. When its value is 'TRUE' or 'ON', the UE is configured with subband precoding. In this case, a plurality of PMIs (including one PMI, depending on the embodiment) according to one of the four aforementioned embodiments for subband precoding can be used. When its value is 'FALSE' or 'OFF', the UE is configured with "wideband" precoding. In this case, one PMI is used regardless of UE resource allocation.

In a second embodiment, a UE is configured with either dynamic or semi-dynamic beamforming dynamically either via a MAC control element (MAC CE) or via an UL grant transmitted on a DL control channel.

One example of this second embodiment is to utilize one DCI parameter to indicate a choice of transmission scheme or mode (either dynamic or semi-dynamic) the UE shall use for the granted UL data transmission (or more generally, the first or the second transmission scheme). In this example, the PMI field that is a part of the DCI in the UL grant can be used for both dynamic and semi-dynamic beamforming. Depending on the value of this DCI parameter (that is, whether the UE is configured with dynamic or semi-dynamic beamforming, or more generally, the first or the second transmission scheme), a PMI field is also needed. This PMI field indicates the precoding matrix or vector the UE shall use for the granted UL data transmission when the UE is configured with dynamic beamforming. When the UE is configured with semi-dynamic beamforming, the PMI field can indicate the choice of a group of precoding matrices or vectors the UE shall use for the granted UL data transmission. A DCI field BeamformingScheme that takes value of 0 (representing, for example, semi-dynamic beamforming) or 1 (representing, for example, dynamic beamforming).

Another example of this second embodiment is to utilize only one PMI field that is a part of the DCI in the UL grant. In this case, given a total of $N_H$ possible hypotheses associated with the B-bit PMI field (where $N_H \leq 2^B$), some $N_{H,d}$ of the $N_H$ hypotheses can be utilized for indicating precoder selection for dynamic beamforming while the rest ($N_{H,sd}=N_H-N_{H,d}$ hypotheses) can be utilized for indicating the selected group of precoders for semi-dynamic beamforming.

To facilitate subband precoding for dual-stage precoder, several optional embodiments analogous to the above embodiments and examples in FIGS. 6, 7, and 8 for single-stage precoder can be extended to accommodate a pair of PMI values ($i_1$, $i_2$), where $i_1$ (which can be composed of ($i_{1,1}$, $i_{1,2}$, for two-dimensional codebook) is wideband and $i_2$ subband. In this case, the number of bits associated with $i_1$ (which is composed of ($i_{1,1}$, $i_{1,2}$) for two-dimensional codebook) remains the same regardless of the number of PMIs or the UE resource allocation. That is, only one DCI field is needed to signal $i_1$ (which can be composed of ($i_{1,1}$,$i_{1,2}$) for two-dimensional codebook) regardless of the number of PMIs or the UE resource allocation. Only the number of bits associated with $i_2$ can scale or change depending on the number of PMIs or the UE resource allocation. Consequently, the precoding information includes only one $i_1$ (which is composed of ($i_{1,1}$,$i_{1,2}$) for two-dimensional codebook) parameter and possibly a plurality of $i_2$ (each value of $i_2$ corresponding to a group of RBs). In particular, for embodiment 2 (720 of FIG. 7) wherein a second-level DL control information that includes subband PMIs is used, $i_1$ can be included in the DCI (or first-level DCI) since $i_1$ (which can be composed of ($i_{1,1}$,$i_{1,2}$) for two-dimensional codebook) is wideband. Since $i_2$ subband, the subband PMIs included in the second-level DL control information comprises $i_2$ for all the subbands corresponding to the allocated UL resource.

Any of the embodiments for supporting subband precoding is applicable for dynamic beamforming hence can be combined with a mechanism for semi-dynamic beamforming. That is, dynamic beamforming can be associated with a DL control signaling mechanism for subband precoding while semi-dynamic beamforming with a DL control mechanism for indicating a group or a set of precoders for the purpose of precoder/beamformer cycling.

In addition, when dynamic and semi-dynamic beamforming can be configured dynamically for a UE, it is also possible to configure a UE with either a single precoder for all the allocated RBs ("wideband" precoding) or a subband precoding via higher-layer (RRC) signaling. In this case, an RRC parameter is used to configure the UE with either "wideband" precoding (single precoder for all the allocated RBs) or subband precoding (possibly a plurality of precoders, each for a subset of the allocated RBs). For example, a two-valued RRC parameter SubbandPrecodingEnabled can be used. When its value is 'TRUE' or 'ON', the UE is configured with subband precoding. In this case, a plurality of PMIs (including one PMI, depending on the embodiment) according to one of the four aforementioned embodiments for subband precoding can be used. When its value is 'FALSE' or 'OFF', the UE is configured with "wideband" precoding. In this case, one PMI is used regardless of UE resource allocation.

For the fourth component (that is, supporting reciprocity-based UL transmission), when UL-DL channel reciprocity is feasible such as for TDD scenarios, a UE can obtain an estimate of UL channel from measuring DL CSI-RS. In this case, the UE can calculate its own precoder for a given resource allocation. This obviates the need for signaling a precoder information DCI field via a DL control channel.

Thus, in one embodiment (4.1), a DCI of an UL grant can contain only the number of transmission layers (that is, the transmission rank) without any PMI. It should be noted, however, that although the UE is capable of obtaining an estimate of UL channel to derive its precoder, this precoder calculation can be inaccurate due to the absence of UL interference information (primarily intra-cell interference, which can only be obtained at the gNB via SRS measurement). This is especially relevant when UL multi-user MIMO (MU-MIMO). To address this problem, several embodiments are proposed in the present disclosure—one of which or some combinations can be utilized.

In another embodiment (4.2), precoding information identical or similar to those described in component 2 or 3 can be utilized. That is, a DCI for UL grant contains precoding information that includes one or a plurality of PMIs depending on whether "wideband" or subband precoding is configured, and/or UE resource allocation. All the embodiments for precoding information DCI field given in component 2 or 3 apply.

In another embodiment (4.3), a precoding information DCI field containing only a single field is signaled via a DL control channel. This single field can indicate a group or a set of precoders. This set of precoders can be taken from a predefined codebook and defined as a subset of all the precoders in the codebook. This precoder subset selection can be done for each rank value that is indicated to the UE via the transmit RI or TRI. In this case, for a given value of RI (or TRI), the PMI (or TPMI) indicates a precoder subset or group specific to the value of RI (or TRI). Optionally, this precoder subset selection can be done across the codebook associated with all the possible values of RI or TRI. In this case, a single precoder subset or group that can include precoders from one codebook (associated with one value of RI/TRI) or multiple codebooks (associated with multiple values of RI/TRI) can be defined. Therefore, PMI/TPMI can be interpreted without any reference or with only partial reference to RI/TRI.

This precoder group or set can include precoders that the UE shall either choose or combine from. That is, as the UE can acquire an estimate of the UL channel via CSI-RS by utilizing DL-UL channel reciprocity, this UL channel estimate can then be used to select a precoder from or derive a precoder from a combination of the precoder subset or group indicated via the PMI. This restriction of a subset of precoders can be used (by the gNB) to configure a UE to choose a precoder considering the knowledge of UL intra-cell interference caused by the gNB scheduling. For example, this choice of precoder could minimize intra-cell interference caused by this UE to other UEs, or caused by other UEs to this UE. Optionally, this single field can indicate a group of precoders the UE shall avoid. This avoidance from a subset of precoders can be used (by the gNB) to configure a UE to avoid choosing a precoder considering the knowledge of UL intra-cell interference caused by the gNB scheduling. For example, this choice of precoder could exacerbate intra-cell interference caused by this UE to other UEs, or caused by other UEs to this UE.

The same signaling mechanism as that used for semi-dynamic beamforming can be used in this embodiment. For example, if a single-stage precoder or codebook is used, a precoding group DCI signaling mechanism similar to TABLE 1-A or 1-B for semi-dynamic beamforming can be utilized as exemplified in TABLE 2-A. Here $G_p$ represents a p-th group of B precoders.

TABLE 2-A

Example precoding information table
for TDD scenario: one-stage precoder

| PMI value i | Precoder group |
|---|---|
| 0 | $G_0$ |
| 1 | $G_1$ |
| 2 | $G_2$ |
| ... | ... |
| P − 1 | $G_{P-1}$ |

If a dual-stage precoder or codebook is used, a PMI field in the precoding information field signaled to a UE includes only the first PMI $i_1$ (which can be composed of ($i_{1,1}$, $i_{1,2}$) for two-dimensional precoder) that also represents a group of precoders. Such precoding group signaling is "wideband", that is, only one field is signaled for any UE resource allocation.

Any of the above three embodiments can be used for TDD scenario wherein DL-UL channel reciprocity is feasible. Optionally, at least two of these three embodiments can be supported and configured for a UE via higher-layer (RRC) signaling.

When DL CSI-RS is used for UL CSI acquisition (especially for precoder calculation), the UE can be configured with at least one CSI-RS resource for this purpose. This CSI-RS resource configuration can be the same as or different from that used for DL CSI acquisition. Typical CSI-RS resource parameters can be included in this resource configuration such as the number of CSI-RS ports, time-domain behavior (periodic, semi-persistent, or aperiodic), subframe configuration (which includes subframe offset and periodicity—applicable for periodic and semi-persistent CSI-RS), EPRE (energy per RE) or power level, CSI-RS pattern (within one slot/subframe, which also includes frequency density), and when more than one CSI-RS resource can be configured, the number of NZP CSI-RS resources (K>1).

If the same CSI-RS resource configuration as that for DL CSI acquisition is used for UL CSI acquisition, a higher-layer (RRC) parameter can be used to indicate whether the CSI-RS resource configuration corresponds to DL or UL measurement (e.g. either CSI, channel, or interference measurement—note that UL and DL interference profiles are typically not reciprocal). Optionally, this indication can be included in either Resource setting or Measurement Setting for UL CSI acquisition. Optionally, an indication to differentiate (in its configuration via higher-layer signaling) the use of this CSI-RS between DL from UL measurement can be avoided by configuring a UE with K≥1 CSI-RS resources and dynamically signaling a CSI-RS resource index to the UE either via a MAC CE or an UL-related DCI. This CSI-RS resource index indicates which N (e.g. N=1) out of K configured CSI-RS resources is assigned to the UE for UL CSI measurement/acquisition. In this case, each of the K CSI-RS resources can be assigned its own parameters (such as the number of ports, subframe configuration when applicable, patterns, etc.)

When a UE is configured with CSI-RS resource for UL CSI measurement, a constraint can also be imposed for CSI or precoder calculation. For example, the number of UE antenna ports assumed for CSI calculation using DL CSI-RS can be set as the number of SRS antenna ports used for a corresponding SRS resource setting. Another possible constraint the UE can assume is the bandwidth of CSI-RS transmission. When a CSI-RS resource is configured for UL measurement, its transmission bandwidth can be set as either the UL transmission bandwidth, the RBs associated with UL resource allocation included in an UL-related DCI (especially relevant for aperiodic CSI-RS), or a preconfigured value (signaled via higher-layer/RRC, MAC CE, or L1 DL control signaling such as DCI).

To facilitate the use of DL-UL channel reciprocity for UL transmission, several optional embodiments can be used.

In one embodiment, additional 'no PMI' configuration and/or 'precoder set/group' configuration can be added in addition to 'subband PMI' (one PMI per subband within the allocated resource/RBs) and 'wideband PMI' (one PMI representing all the subbands in the allocated resource/RBs). This PMI configuration can be used in conjunction with transmission scheme configuration.

In another embodiment, a separate UL transmission scheme can be defined in addition to the existing transmission schemes. For example, in addition to 'dynamic beamforming' (or transmission scheme 1) and 'semi-dynamic beamforming' (or transmission scheme 2, for example, diversity-based transmission scheme), 'reciprocity-based' or transmission scheme 3) can be defined. For example, when a UE is configured with 'reciprocity-based' transmission scheme (or transmission scheme 3), the UE can interpret the precoding information (PMI) in an UL-related DCI as an indicator of precoder set/group for the UE. Based on DL channel measurement from CSI-RS, the UE can acquire an estimate of the UL channel via DL-UL channel reciprocity. This UL channel estimate can then be used to select a precoder from or derive a precoder from a combination of the precoder subset or group indicated via the PMI. With this procedure, the UE can calculate a single precoder for all the allocated RBs or one precoder for each of the allocated RBs. Such precoder calculation can be specified or left to UE implementation.

In yet another embodiment, a separate configuration can be defined to indicate whether a UE is configured with 'reciprocity-based' or 'non-reciprocity-based' UL transmission or precoder calculation or PMI mode or, simply, PMI interpretation. This configuration can be signaled via higher-layer (RRC) or L1/L2 control signaling (DCI or MAC CE). Likewise, when the UE is configured with 'reciprocity-based' operation, the UE can interpret the precoding information (PMI) in an UL-related DCI as an indicator of precoder set/group for the UE. Based on DL channel measurement from CSI-RS, the UE can acquire an estimate of the UL channel via DL-UL channel reciprocity. This UL channel estimate can then be used to select a precoder from or derive a precoder from a combination of the precoder subset or group indicated via the PMI. Likewise, with this procedure, the UE can calculate a single precoder for all the allocated RBs or one precoder for each of the allocated RBs. Such precoder calculation can be specified or left to UE implementation.

Embodiment 4.3 of the fourth component is described assuming the use of a single PMI/TPMI that indicates an assigned precoder subset/group. Consequently, if the UE applies frequency selective precoding to the corresponding UL transmission, the UE assumes the same precoder subset/group for all the allocated RBs. For high-frequency scenarios wherein the allocated RBs can span a wide frequency range, however, a single precoder group used for all the allocated RBs may not be sufficient. Therefore, in a variation of this embodiment, a plurality of PMIs/TPMIs can be included in an UL-related DCI wherein each PMI/TPMI indicates a precoder group/subset assignment for a particular subband. That is, the precoder group/subset assignment is frequency-selective. For this variation, any of the embodiments pertaining to the second component wherein subband PMI/TPMI is signaled in an UL-related DCI applies. In this case, the subband size or configuration for precoder group/subset assignment can be the same or different from that for precoder assignment.

For the fifth component (that is, support two-waveform UL transmission), an UL transmission can support both OFDM (CP-OFDM, that is, OFDM with cyclic prefix) and DFT-S-OFDM (DFT-spread OFDM) where DFT-S-OFDM is used for single-stream transmission. In this case, several possible embodiments can be described as follows.

In one embodiment (5.1), when a UE is configured with UL SU-MIMO, the UE transmits UL data on physical uplink channel (analogous to LTE PUSCH) using CP-OFDM regardless of the transmission rank (the number of transmission layers). When a UE is configured with single-stream transmission (non UL SU-MIMO, without rank adaptation capability), a UE can be configured with either CP-OFDM or DFT-S-OFDM. This configuration can be signaled either via higher-layer (RRC) signaling, MAC control element (MAC CE), or L1 DL control signaling (included in an UL-related DCI).

In one variation of embodiment 5.1 (embodiment 5.2), for single-stream transmission, instead of receiving a configuration signaling, a UE can signal (to the network or gNB) its own choice of multiple-access scheme (waveform) via an uplink channel. This signaling can be included either as a part of UL data transmission or as a separate UL transmission (such as that on an UL control channel).

In another variation of embodiment 5.1 (embodiment 5.3), in addition to the description pertaining to embodiment 5.1, the following additional UE procedure is supported. When a UE is configured with UL SU-MIMO, a fallback transmission scheme of DFT-S-OFDM-based single-stream transmission is supported. This fallback transmission can be dynamically scheduled for the UE via an UL-related DCI different from the one used for UL SU-MIMO transmission. The size of this "fallback DCI" can be significantly smaller than that for UL SU-MIMO transmission and located in either a same search space or a different search space (for instance, a common search space) from that for UL SU-MIMO transmission. This fallback transmission scheme can be the same or different from that for the single-stream transmission associated with the non-UL SU-MIMO transmission. This transmission scheme can be used, for instance, when a UE configured with UL SU-MIMO transmission is in a coverage-limited situation.

In another embodiment (5.4), when a UE is configured with UL SU-MIMO, the UE transmits UL data on physical uplink channel (analogous to LTE PUSCH) using CP- OFDM for rank-2 (two-layer transmission) and above. For rank-1 (one-layer transmission), a UE can be configured to transmit with either CP-OFDM or DFT-S-OFDM. This configuration can be signaled either via higher-layer (RRC) signaling, MAC CE, or L1 DL control signaling. For the last approach (via L1 DL control signaling), an UL-related DCI associated with UL SU-MIMO transmission includes either a one-bit DCI field indicating which waveform (CP-OFDM or DFT-S-OFDM) is used when the value of RI is one, or these two hypotheses (CP-OFDM or DFT-S-OFDM) are jointly encoded with other hypotheses such as RI and/or precoding hypotheses.

In addition, when the UE transmits with DFT-S-OFDM, a single precoder (frequency non-selective precoder) is used.

For this embodiment, when a UE is configured with single-stream transmission (non UL SU-MIMO, without rank adaptation capability), a UE can be configured with either CP-OFDM or DFT-S-OFDM. Likewise, this configuration can be signaled either via higher-layer (RRC) signaling, MAC control element (MAC CE), or L1 DL control signaling (included in an UL-related DCI).

For all the above embodiments, whenever DFT-S-OFDM is used, a single-carrier version of DFT-S-OFDM (single-carrier FDMA, SC-FDMA) where a UE is configured to transmit on a set of contiguous PRBs can be used.

For all the above embodiments, whenever a single-stream transmission is used, either transmit diversity or a single-port transmission can be used.

The names for UL transmission channels or waveforms are example and can be substituted with other names or labels without changing the substance and/or function of this embodiment.

Figure 9:
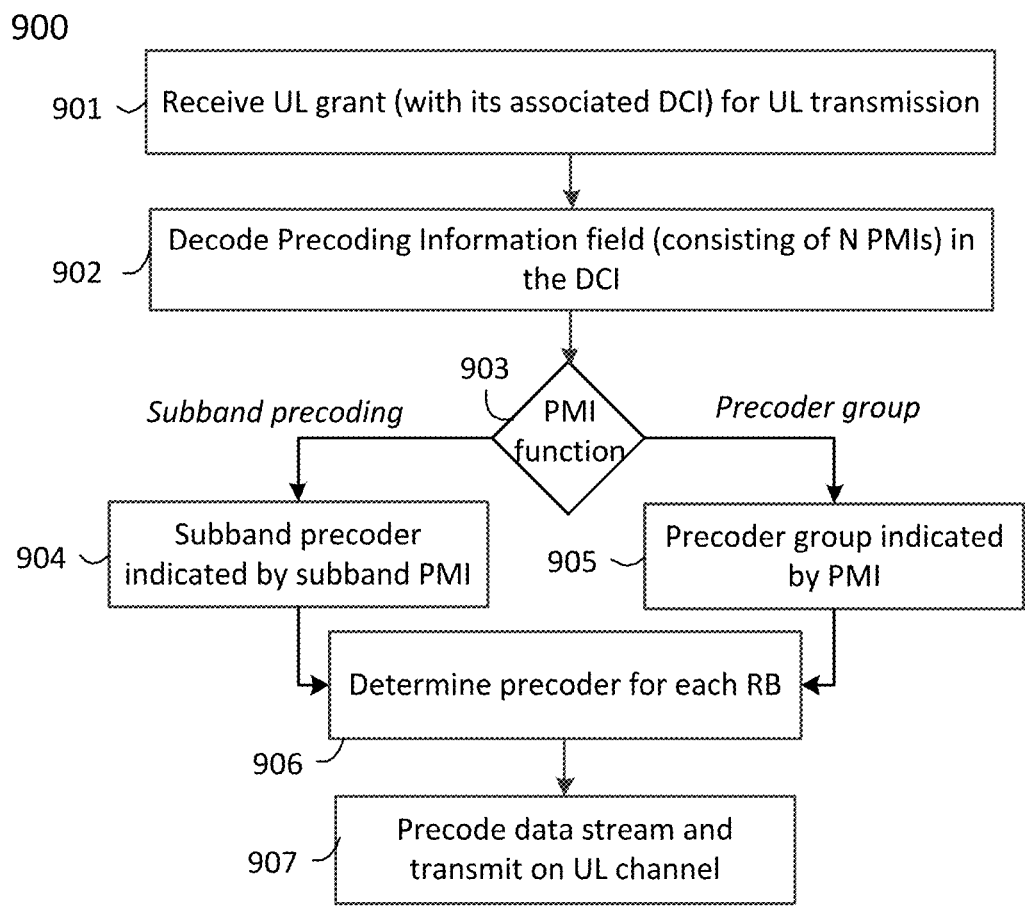
FIG. 9 illustrates a flowchart for an example method wherein a UE receives an UL grant for UL transmission that includes a Precoding Information field associated with a plurality of precoders according to an embodiment of the present disclosure.

FIG. 9 illustrates a flowchart for an example method 900 wherein a UE receives an UL grant for an UL transmission that includes a Precoding Information field associated with a plurality of precoders according to an embodiment of the present disclosure. For example, the method 900 can be performed by the UE 116.

The method 900 begins with the UE receiving an UL grant for UL transmission (step 901) and decoding a Precoding Information field in a DCI that is associated with the UL grant wherein the Precoding Information field includes at least PMI corresponding to a plurality of precoders (step 902). The composition of the Precoding Information field depends on the function of the PMI (step 903). If PMI is used for subband precoding indication, the number of PMIs is at least equal to the number of precoders and at least one PMI is associated with a subband that corresponds to at least one RB (step 904). In one option, the number of PMIs can be fixed and the number of RBs per subband depends on the allocated RBs as indicated in an UL Resource Allocation (RA) field of the DCI. For example, the number of PMIs is at least two and the DCI further includes a Subband Indicator field for one of the PMIs. In another option, at least one PMI that is associated with a subband is transmitted separately from the DCI that includes the RA field. If PMI is used for precoder group indication, the number of PMIs is one and the PMI indicates a group including a plurality of precoders (step 905). In this case, the UE either selects a precoder from the group or derives a precoder from a combination of at least two precoders in the group for the granted UL transmission. Based on such function, the precoder for each of the allocated RBs is determined (step 906). The UE further precodes a data stream that is then transmitted on an UL channel (step 907). This UL channel can be an UL control channel (analogous to LTE PUCCH), UL data channel (analogous to LTE PUSCH), or a combination of the two.

Figure 10:
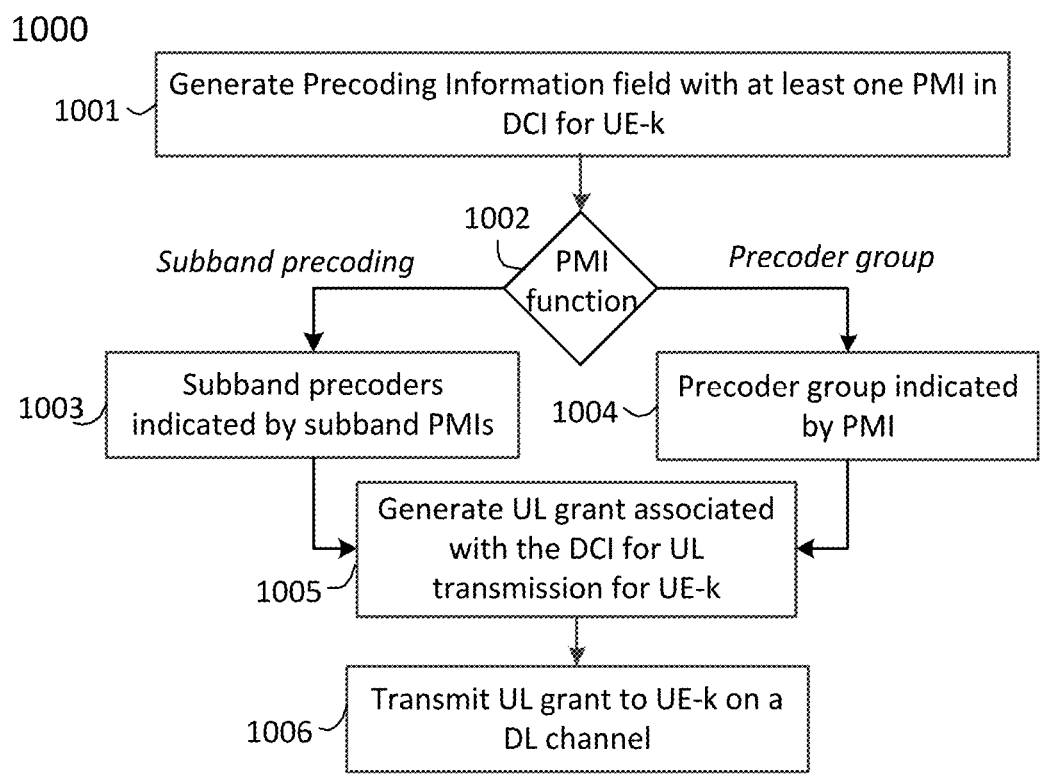
FIG. 10 illustrates a flowchart for an example method wherein a BS generates a Precoding Information field with at least one PMI for a UE (labeled as UE-k) according to an embodiment of the present disclosure.

FIG. 10 illustrates a flowchart for an example method wherein a BS generates a Precoding Information field with at least one PMI for a UE (labeled as UE-k) according to an embodiment of the present disclosure. For example, the method 1000 can be performed by the BS 102.

The method 1000 begins with the BS generating, for UE-k, a Precoding Information DCI field with at least one PMI (step 1001). The composition of the Precoding Information field depends on the function of the PMI (step 1002). If PMI is used for subband precoding indication, the number of PMIs is at least equal to the number of precoders and at least one PMI is associated with a subband that corresponds to at least one RB (step 1003). In one option, the number of PMIs can be fixed and the number of RBs per subband depends on the allocated RBs as indicated in an UL Resource Allocation (RA) field of the DCI. For example, the number of PMIs is at least two and the DCI further includes a Subband Indicator field for one of the PMIs. In another option, at least one PMI that is associated with a subband is transmitted separately from the DCI that includes the RA field. If PMI is used for precoder group indication, the number of PMIs is one and the PMI indicates a group including a plurality of precoders (step 1004). Based on such function, the BS generates the UL grant with the DCI for UL transmission to UE-k (step 1005) and transmits the UL grant to UE-k on a DL channel (step 1006). This transmission can be done via a DL control channel (analogous to LTE PDCCH or ePDCCH) or a combination between DL control channel and DL data channel (analogous to LTE PDSCH).

Although FIGS. 9 and 10 illustrate examples of methods for receiving configuration information and configuring a UE, respectively, various changes could be made to FIGS. 9 and 10. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:
1. A user equipment (UE) comprising:
a transceiver configured to receive, from a base station (BS), configuration information that includes a selected uplink (UL) transmission scheme and at least one reference signal (RS) resource; and
a processor operably connected to the transceiver, the processor configured to:
decode the configuration information;
determine the selected UL transmission scheme; and
determine the at least one RS resource for an UL precoder calculation,
wherein the selected UL transmission scheme is one of an UL transmission without precoding matrix indicator (PMI) and an UL transmission with PMI,
wherein the at least one RS resource corresponds to a channel state information RS (CSI-RS) resource, and
wherein the CSI-RS resource is used for the UL precoder calculation when the selected UL transmission scheme corresponds to the UL transmission without the PMI in an UL-related downlink control information (DCI).

2. The UE of claim 1, wherein the configuration information is conveyed via higher-layer or radio resource controller (RRC) signaling.

3. The UE of claim 1, wherein the UE is configured with only one CSI-RS resource for the UL precoder calculation.

4. The UE of claim 3, wherein the UE is further configured with at least one sounding RS (SRS) resource.

5. The UE of claim 3, wherein the UE is further configured with four sounding RS (SRS) resources.

6. The UE of claim 1, wherein the UE is configured with more than one CSI-RS resource for the UL precoder calculation.

7. A base station (BS) comprising:
a processor configured to:
generate, for a user equipment (UE), configuration information that includes a selected uplink (UL) transmission scheme and at least one reference signal (RS) resource; and
a transceiver operably connected to the processor, the transceiver configured to:
transmit, to the UE, the configuration information; and
transmit, to the UE, an UL-related downlink control information (DCI),
wherein the selected UL transmission scheme is one of an UL transmission without precoding matrix indicator (PMI) and an UL transmission with PMI,
wherein the at least one RS resource corresponds to a channel state information RS (CSI-RS) resource, and
wherein the CSI-RS resource is used for an UL precoder calculation when the selected UL transmission scheme corresponds to the UL transmission without the PMI in the UL-related DCI.

8. The BS of claim 7, wherein the configuration information is conveyed via higher-layer or radio resource controller (RRC) signaling.

9. The BS of claim 7, wherein the UE is configured with only one CSI-RS resource for the UL precoder calculation.

10. The BS of claim 9, wherein the UE is further configured with at least one sounding RS (SRS) resource.

11. The BS of claim 9, wherein the UE is further configured with four sounding RS (SRS) resources.

12. A method for operating a user equipment (UE), the method comprising:
receiving, from a base station (BS), configuration information that includes a selected uplink (UL) transmission scheme and at least one reference signal (RS) resource for precoder calculation;
decoding the configuration information; and
determining the selected UL transmission scheme and the at least one RS resource for an UL precoder calculation,
wherein the selected UL transmission scheme is one of an UL transmission without precoding matrix indicator (PMI) and an UL transmission with PMI,
wherein the at least one RS resource corresponds to a channel state information RS (CSI-RS) resource, and
wherein the CSI-RS resource is used for the UL precoder calculation based on the selected UL transmission scheme corresponding to the UL transmission without the PMI in an UL-related downlink control information (DCI).

13. The method of claim 12, wherein the configuration information is conveyed via higher-layer or radio resource controller (RRC) signaling.

14. The method of claim 12, wherein the UE is configured with only one CSI-RS resource for the UL precoder calculation.

15. The method of claim 14, wherein the UE is further configured with at least one sounding RS (SRS) resource.

16. The method of claim 14, wherein the UE is further configured with four sounding RS (SRS) resources.

17. The method of claim 12, wherein the UE is configured with more than one CSI-RS resource for the UL precoder calculation.

* * * * *